(12) United States Patent
Cho et al.

(10) Patent No.: US 11,433,877 B2
(45) Date of Patent: Sep. 6, 2022

(54) HYBRID VEHICLE AND DRIVING CONTROL METHOD THEREFOR

(71) Applicants: HYUNDAI MOTOR COMPANY, Seoul (KR); KIA MOTORS CORPORATION, Seoul (KR)

(72) Inventors: Jin Kyeom Cho, Suwon-si (KR); Jea Mun Lee, Seoul (KR); Sung Bae Jeon, Ansan-si (KR); Hui Un Son, Suwon-si (KR); Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 243 days.

(21) Appl. No.: 16/510,290

(22) Filed: Jul. 12, 2019

(65) Prior Publication Data
US 2020/0172083 A1 Jun. 4, 2020

(30) Foreign Application Priority Data
Dec. 3, 2018 (KR) ........................ 10-2018-0153703

(51) Int. Cl.
*B60W 20/40* (2016.01)
*B60W 10/26* (2006.01)
(Continued)

(52) U.S. Cl.
CPC ............. *B60W 20/40* (2013.01); *B60K 6/44* (2013.01); *B60L 50/16* (2019.02); *B60L 50/61* (2019.02);
(Continued)

(58) Field of Classification Search
CPC ...... B60W 20/40; B60W 10/06; B60W 10/08; B60W 10/26; B60W 20/10;
(Continued)

(56) References Cited

U.S. PATENT DOCUMENTS

| 2002/0062183 A1* | 5/2002 | Yamaguchi | B60W 20/10 701/22 |
| 2008/0029063 A1* | 2/2008 | Tokura | F16H 61/0437 123/395 |

(Continued)

OTHER PUBLICATIONS

Englis Translation of EP 1300273 B1 Author: Yoshino Takahiro Title: Method For Improving Acceleration Reponse Of A Hybrid Vehicle Date: Jul. 14, 2010 (Year: 2010).*

*Primary Examiner* — James J Lee
*Assistant Examiner* — Steven Vu Nguyen
(74) *Attorney, Agent, or Firm* — Slater Matsil, LLP

(57) ABSTRACT

A hybrid vehicle and a control method are provided. The method of controlling a hybrid vehicle including a motor, an engine, and an engine clutch disposed between the motor and the engine includes determining whether to enter a first mode in which both the engine and the motor operate without engagement of the engine clutch, based on at least a first condition related to an accelerator pedal and a second condition related to a required torque condition, determining torque of the motor in consideration of at least required torque upon determining entry into the first mode, and determining an operating point of the engine based on engine generation power to be supplied to the motor with power of the engine.

20 Claims, 9 Drawing Sheets

(51) Int. Cl.
  *B60W 20/10* (2016.01)
  *B60W 10/08* (2006.01)
  *F02D 31/00* (2006.01)
  *B60L 50/16* (2019.01)
  *B60W 10/06* (2006.01)
  *B60K 6/44* (2007.10)
  *B60L 50/61* (2019.01)

(52) U.S. Cl.
  CPC ............ *B60W 10/06* (2013.01); *B60W 10/08* (2013.01); *B60W 10/26* (2013.01); *B60W 20/10* (2013.01); *F02D 31/007* (2013.01); *B60W 2540/10* (2013.01); *B60W 2710/0644* (2013.01); *B60W 2710/081* (2013.01)

(58) Field of Classification Search
  CPC ..... B60W 2540/10; B60W 2710/0644; B60W 2710/081; B60L 50/61; B60L 50/16; B60K 6/44; F02D 31/007
  See application file for complete search history.

(56) References Cited

U.S. PATENT DOCUMENTS

| 2012/0095655 | A1* | 4/2012 | Hyodo ................. | B60W 10/06 701/50 |
| 2013/0079967 | A1* | 3/2013 | Terakawa ............. | B60W 10/02 701/22 |
| 2017/0259804 | A1* | 9/2017 | Lee ..................... | B60W 30/186 |
| 2019/0126908 | A1* | 5/2019 | Yokota ................. | B60W 10/08 |

* cited by examiner

HYBRID VEHICLE AND DRIVING CONTROL METHOD THEREFOR

The present application claims priority to and the benefit of Korean Patent Application No. 10-2018-0153703, filed on Dec. 3, 2018, which is incorporated herein by reference in its entirety.

FIELD

The present disclosure relates to a hybrid vehicle capable of providing excellent operability and acceleration performance during low-speed driving, and a driving control method therefor.

BACKGROUND

The statements in this section merely provide background information related to the present disclosure and may not constitute prior art.

Hybrid vehicles (hybrid electric vehicles (HEVs)) generally refer to vehicles using two power sources: an engine and an electric motor. Recently, such hybrid vehicles are being developed because the hybrid vehicles are superior to vehicles including only an internal combustion engine in terms of fuel efficiency and power performance and are also advantageous in reduction of exhaust gas.

Such a hybrid vehicle may operate in two driving modes, depending on which powertrain is driven. One of the two modes is an electric vehicle (EV) mode using an electric motor and the other thereof is an HEV mode for operating both an electric motor and an engine. The hybrid vehicle performs switching between the two modes according to driving conditions.

Switching between driving modes is generally performed for the purpose of maximizing fuel efficiency or driving efficiency according to the efficiency characteristics of the powertrain.

First, the structure of a hybrid vehicle will be described. FIG. 1 shows an example of a powertrain structure of a general parallel-type hybrid vehicle.

Referring to FIG. 1, a powertrain of a hybrid vehicle using a parallel-type hybrid system in which an electric motor (or a driving motor) 140 and an engine clutch (EC) 130 are mounted between an internal combustion engine (ICE) 110 and a transmission 150 is shown.

In such a vehicle, generally, when a driver presses an accelerator after startup, the motor 140 is first driven using power of a battery in a state in which the engine clutch 130 is open, and power of the motor is transmitted to the transmission 150 and a final drive (FD) 160, thereby moving wheels (that is, an EV mode). When larger driving force is required as the vehicle is gradually accelerated, an auxiliary motor (or a starting power generation motor) 120 may operate to drive the engine 110.

When the rotation speeds of the engine 110 and the motor 140 become equal to each other, the engine clutch 130 is engaged and the engine 110 and the motor 140 drive the vehicle or the engine 110 drives the vehicle (that is, the EV mode transitions to the HEV mode). When a predetermined engine off condition such as vehicle deceleration is satisfied, the engine clutch 130 is open and the engine 110 is stopped (that is, the HEV mode transitions to the EV mode). In addition, in the hybrid vehicle, driving force of the wheels during braking may be converted into electric energy to charge the battery, which is referred to as braking energy regeneration or regenerative braking.

The starting power generation motor 120 serves as a starter motor when the engine is started and operates as a power generator at the time of recovery of the rotation energy of the engine after startup or at an off time. Therefore, the starting power generation motor 120 may be referred to as a hybrid starter generator (HSG) and, in some cases, may be referred to as an auxiliary motor.

The driving mode of the hybrid vehicle based on the above-described structure will be described in greater detail.

The EV mode is mainly applied at a low speed and low torque, the engine clutch 130 is open and only the motor 140 is used as a power source to transmit torque to wheels.

The HEV mode is mainly applied at a high speed and high torque, and the engine 110 and the motor 140 are used as power sources. This mode may be classified into an HEV series mode and an HEV parallel mode. In the HEV series mode, the engine clutch 130 is open and only the motor 140 used to generate power in the HSG 120 directly generates driving force as the power of the engine 110. In contrast, in the HEV parallel mode, the engine clutch 130 is locked and driving force of the engine 110 and driving force of the motor 140 are transmitted to the wheels.

Meanwhile, up to now, hybrid vehicles have focused upon eco-friendly characteristics. In recent years, hybrid systems are being applied to high-performance vehicles. However, in general hybrid vehicles, it is difficult to satisfy operability and acceleration performance required in high-performance vehicles at the time of low-speed driving. This will be described with reference to FIG. 2.

FIG. 2 is a graph illustrating problems at the time of low-speed driving in a general hybrid vehicle. FIG. 2 shows four graphs, with vertical axes representing output torque, the RPM of a motor and an engine, an APS value and a driving mode from top to bottom and horizontal axes commonly representing time.

Referring to FIG. 2, when a driver operates an accelerator pedal with a value exceeding predetermined mode switching threshold power (or threshold torque) while the hybrid vehicle travels at a low speed in the EV mode, switching to the HEV mode is determined in order to satisfy required power in the hybrid vehicle and thus the engine is started and an engine clutch is engaged. In addition, when the driver takes a foot off the accelerator pedal, switching back to the EV mode is performed and thus the engine clutch is disengaged.

As such a process is repeated, the driver may follow the required torque. However, whenever the engine clutch is engaged, engagement shock occurs and operability deteriorates. In addition, before the engine clutch is engaged, rising of engine RPM is delayed due to control for synchronization between the engine and the electric motor in terms of RPM. Therefore, the driver feels a sense of difference due to mismatch between an APS operation amount and the RPM of the engine.

As a result, even in a high-performance hybrid vehicle, it is impossible to control the RPM of the engine to a value desired by the driver. Therefore, the sense of direct connection between the engine RPM and the accelerator pedal recognized by the driver, that is, acceleration responsiveness, is lowered. This means that the driver cannot control the sense of torque and exhaust sound according to the RPM. Therefore, it is impossible to satisfy the sports driving sense of the driver.

Of course, in a high-speed driving situation, since the HEV mode is highly likely to be maintained, engagement shock of the engine clutch and inconsistency of the RPM of the engine for synchronization before engagement may be slightly mitigated. However, the above-described problems become more conspicuous in a low-speed driving situation.

SUMMARY

Accordingly, the present disclosure is directed to a hybrid vehicle and a driving control method.

One aspect of the present disclosure is to provide a hybrid vehicle capable of providing improved operability and acceleration responsiveness, and a control method thereof.

Another aspect of the present disclosure is to provide a control method capable of preventing frequent engine engagement and disengagement when a high-performance hybrid vehicle travels at a low speed.

Additional advantages and features of the disclosure will be set forth in part in the description which follows and in part will become apparent to those having ordinary skill in the art upon examination of the following or may be learned from practice of the disclosure. The other advantages of the disclosure may be realized and attained by the structure particularly pointed out in the written description and claims hereof as well as the appended drawings.

In some forms of the present disclosure, a method of controlling a hybrid vehicle including a motor, an engine, and an engine clutch disposed between the motor and the engine includes determining whether to enter a first mode in which both the engine and the motor operate without engagement of the engine clutch, based on at least a first condition related to an accelerator pedal and a second condition related to a required torque condition, determining torque of the motor in consideration of at least required torque upon determining entry into the first mode, and determining an operating point of the engine based on engine generation power to be supplied to the motor with power of the engine.

In another aspect of the present disclosure, a hybrid vehicle includes a motor, an engine, an engine clutch disposed between the motor and the engine, and a hybrid controller unit. The hybrid controller unit includes a mode determination unit configured to determine whether to enter a first mode in which both the engine and the motor operate without engagement of the engine clutch, based on at least a first condition related to an accelerator pedal and a second condition related to a required torque condition, a motor torque calculator configured to determine torque of the motor in consideration of at least required torque upon determining entry into the first mode, and an engine revolutions per minute (RPM) calculator configured to determine an operating point of the engine based on engine generation power to be supplied to the motor with power of the engine.

It is to be understood that both the foregoing general description and the following detailed description of the present disclosure are exemplary and explanatory and are intended to provide further explanation of the disclosure as claimed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
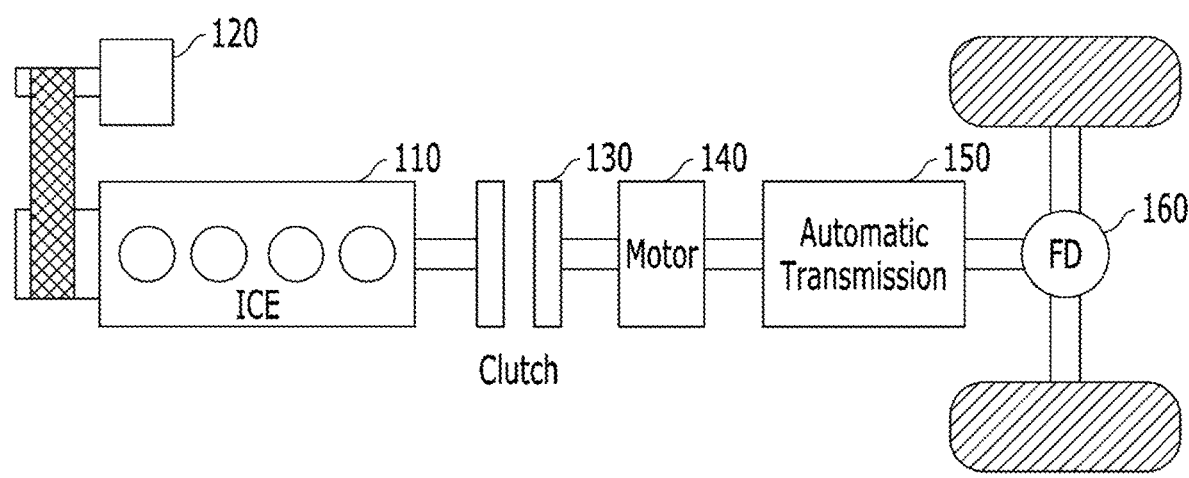
FIG. 1 is a view showing an example of a powertrain structure of a general parallel-type HEV.
Figure 2:
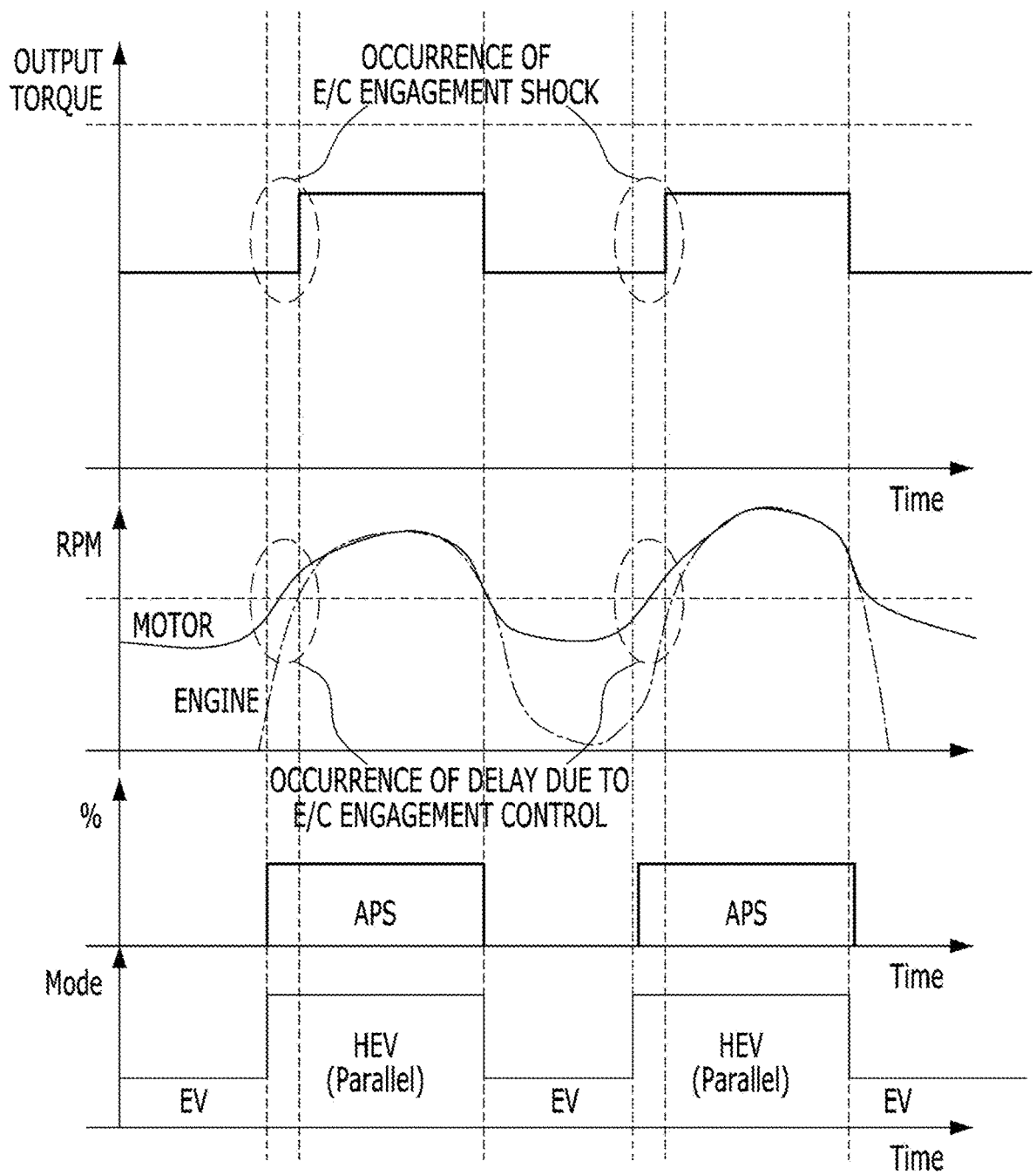
FIG. 2 is a graph illustrating problems at the time of low-speed driving in a general hybrid vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software or a combination thereof.

Prior to description of a hybrid vehicle in which driving performance and acceleration responsiveness are improved at the time of low-speed driving and a control method thereof in some forms of the present disclosure, a control system of a hybrid vehicle will be described. The basic powertrain structure of the hybrid vehicle applicable to some forms of the present disclosure is shown in FIG. 1. A relationship between control units in the vehicle, to which such a powertrain is applied, is shown in FIG. 3.

Figure 3:
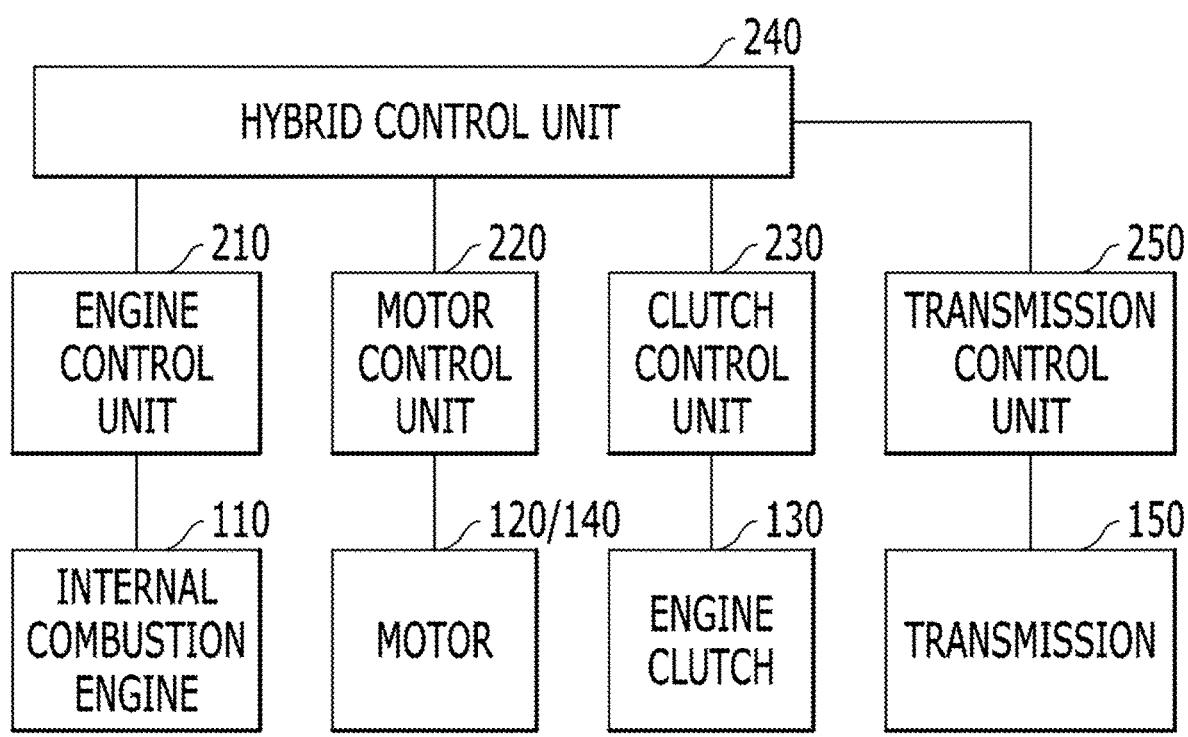
FIG. 3 is a block diagram showing an example of a control system of a hybrid vehicle in one form of the present disclosure.

FIG. 3 is a block diagram showing an example of a control system of a hybrid vehicle in some forms of the present disclosure.

Referring to FIG. 3, in some forms of the present disclosure, an internal combustion engine 110 may be controlled by an engine control unit 210, torques of a starting power generation motor 120 and an electric motor 140 may be controlled by a motor control unit (MCU) 220, and an engine clutch 130 may be controlled by a clutch control unit 230. Here, the engine control unit 210 is also referred to as an engine management system (EMS). In addition, a transmission 150 is controlled by a transmission control unit 250.

In some cases, a control unit of the starting power generation motor 120 and a control unit of the electric motor 140 may be separately provided.

Each control unit may be connected to a hybrid controller unit (HCU) 240 for controlling an overall mode switching process as a high-level control unit thereof to perform operation according to a control signal or provide information necessary for driving mode change or engine clutch control at the time of gear shifting and/or information necessary for engine stop control to the HCU 240 under control of the HCU 240.

More specifically, the HCU 240 determines whether a mode is switched according to the driving state of the vehicle. For example, the HCU determines when the engine clutch 130 is open and performs hydraulic pressure control (in the case of wet EC) or torque capacity control (in the case of dry EC) when the engine clutch is open. In addition, the HCU 240 may determine the state (lock-up, slip, open, etc.) of the engine clutch 130 and control a fuel cut time of the engine 110. In addition, the HCU may transmit a torque command for controlling the torque of the starting power generation motor 120 to the motor control unit 110 for engine stop control and may control engine rotational energy recovery. In addition, the HCU 240 may determine a mode switching condition at the time of driving mode switching control and control a low-level control unit for switching.

Of course, it will be apparent to those skilled in the art that connection relationship between the control units and the functions/division of the control units are illustrative and the names of the control units may be changed. For example, the HCU 240 may be implemented such that the functions thereof are provided by any one of the control units other than the HCU or such that the functions thereof are distributed and provided by two or more of the other control units.

It will be apparent to those skilled in the art that the configuration of FIG. 3 is merely an example of a hybrid vehicle and the structure of the hybrid vehicle.

In some forms of the present disclosure, when a driver operates an accelerator pedal at the time of low-speed driving, instead of directly switching to an HEV parallel mode, the mode is switched to an HEV series mode and torque to be additionally output by operation of the accelerator pedal is obtained with energy generated in an HSG using power of the engine. This concept will be described with reference to FIG. 4.

Figure 4:
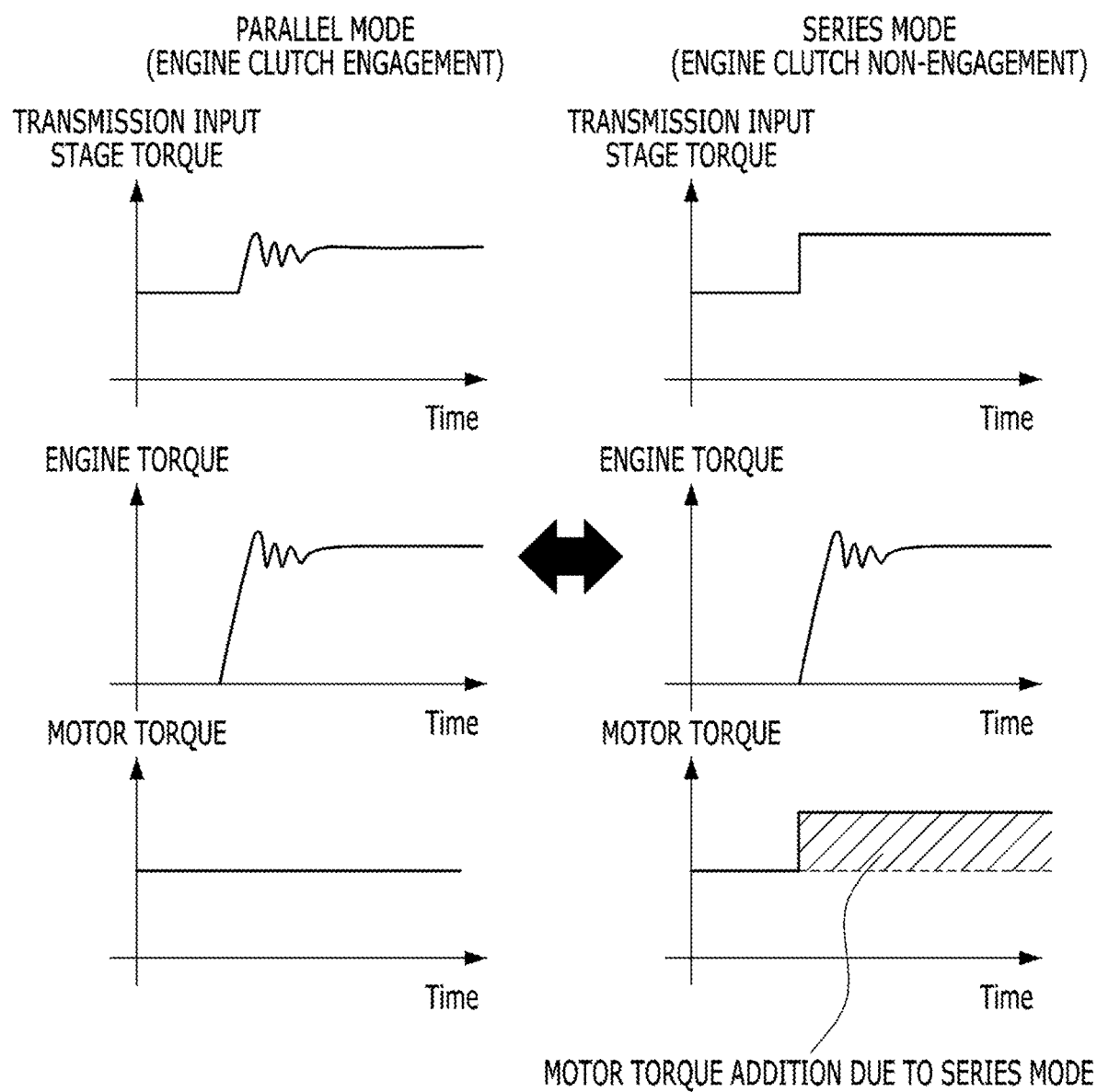
FIG. 4 is a view showing comparison between an HEV series mode in one form of the present disclosure and a parallel mode.

FIG. 4 is a view showing comparison between an HEV series mode in some forms of the present disclosure and a parallel mode.

In FIG. 4, three graphs corresponding to the HEV parallel mode are shown on the left side thereof and three graphs corresponding to the series mode in some forms of the present disclosure are shown on the right side thereof. The vertical axes of the left and right sides indicate transmission input torque, engine torque, and motor torque from top to bottom and the horizontal axes thereof commonly indicate time.

Referring to the left side of FIG. 4, if a general HEV parallel mode is applied according to operation of the accelerator pedal, engine clutch engagement occurs by mode switching from the EV mode and thus shock appears in transmission input stage torque. In contrast, referring to the right side of FIG. 4, even when the EV mode is switched to the HEV series mode in some forms of the present disclosure, engine clutch engagement does not occur and thus engine clutch engagement shock does not occur. In addition, it is possible to rapidly follow required torque through instantaneous rising of motor torque (that is, motor torque addition due to the series mode) using energy generated by the power of the engine.

As a result, if such control is performed, it is possible to prevent unnecessary engine clutch engagement shock and to prevent deterioration in rising of the RPM of the engine for engine clutch engagement control. In addition, in the HEV series mode, rising of the RPM of the engine by engine clutch engagement is not limited. Therefore, by linking accelerator pedal operation with rising of the RPM of the engine, the sense of direct connection with accelerator pedal operation for exhaust sound and the RPM of the engine are improved, the sports driving sense of the driver may be satisfied.

Additionally, while the HEV series mode is applied, it is possible to set a torque boosting function for determining boosting torque to be additionally applied according to the will of the driver. This will be described with reference to FIG. 5.

Figure 5:
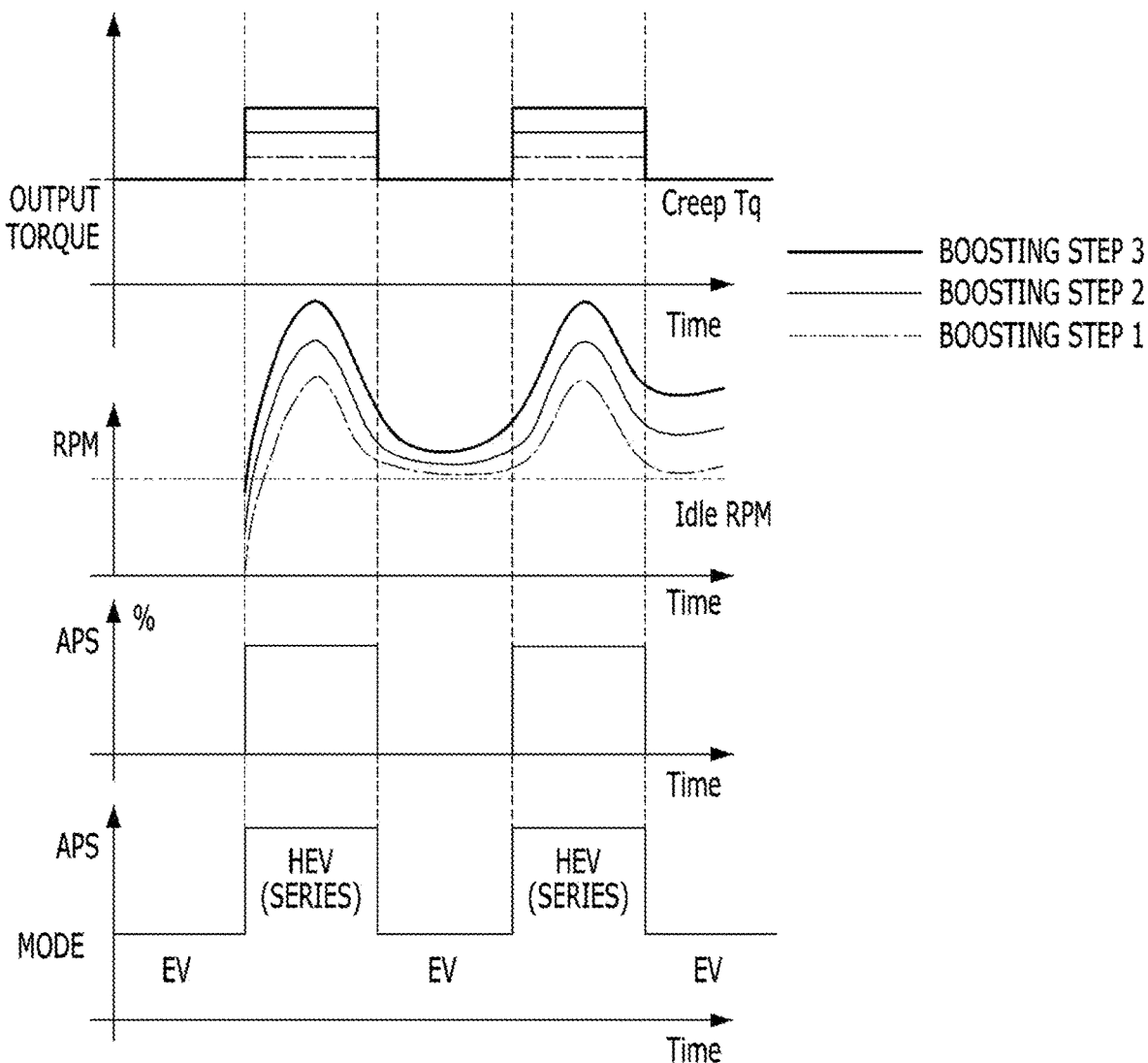
FIG. 5 is a view showing the concept of a torque boosting stage in an HEV series mode in one form of the present disclosure.

FIG. 5 is a view showing the concept of a torque boosting stage in an HEV series mode in some forms of the present disclosure. FIG. 5 shows four graphs, with vertical axes respectively representing output torque, the RPM of the engine, APS value and driving mode from top to bottom and horizontal axes commonly representing time. In addition, the torque boosting stage includes a total of three stages, i.e., Stage 1 to 3. Assume that, the higher the stage, the higher the torque output with respect to the same APS value.

Referring to FIG. 5, the driver operates the accelerator pedal. If a required torque does not exceed a maximum motor torque in the series mode, the mode may be switched to the HEV series mode while operating the accelerator pedal. At this time, when torque boosting is set, the electric motor outputs higher torque with respect to the same APS value in correspondence with the torque boosting stage and the engine operates at a higher RPM. Accordingly, the driver may experience a higher output torque according to boosting setting and feel direct connection between the acceleration pedal and the engine RPM, even when driving the hybrid vehicle.

The torque boosting stage may be set to +/− through paddle shift. However, it will be apparent to those skilled in the art that this operation unit is illustrative and may be implemented through other types of operating systems (e.g., a drive selector, a touch button, a dial, etc.).

Hereinafter, the configuration of a control unit for implementing the series mode in some forms of the present disclosure will be described with reference to FIG. 6.

Figure 6:
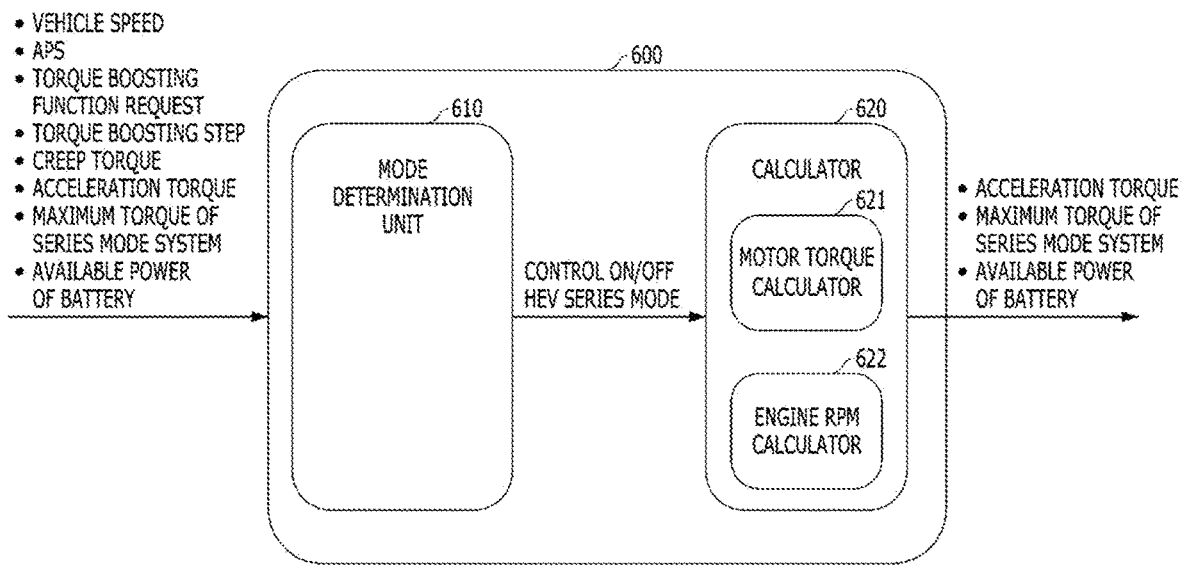
FIG. 6 is a view of an example of the configuration of a control unit for implementing a series mode in one an form of the present disclosure along with input/output information.

FIG. 6 is a view of an example of the configuration of a control unit for implementing a series mode in some forms of the present disclosure along with input/output information.

The series mode control unit 600 shown in FIG. 6 may be implemented as a separate control unit or may be implemented as a portion (or one function) of the above-described HCU 240.

Referring to FIG. 6, the series mode control unit 600 in some forms of the present disclosure may include a mode determination unit 610 and a calculator 620. The calculator 620 may include a motor torque calculator 621 and an engine RPM calculator 622. In addition, the series mode control unit 600 uses at least one of vehicle speed, an APS value, a torque boosting function request, a torque boosting stage, creep torque, acceleration torque, maximum torque of a series mode system, and available power of a battery as input values and has at least one of a target mode, an engine RPM and motor torque as output information. At this time, the engine RPM and the motor torque of the output information are respectively transmitted to the engine control unit 210 and the motor control unit 220 directly or through the HCU 240.

Hereinafter, detailed operation of each component will be described.

First, the mode determination unit 610 determines whether HEV series mode control is activated (on/off) and the basic condition thereof includes an accelerator pedal condition and a torque condition.

Specifically, the accelerator pedal condition may be satisfied when the APS value is equal to or greater than a predetermined value (e.g., 1%). In addition, the torque condition may be satisfied when the sum of the creep torque and the acceleration torque is less than the maximum torque of the series mode system.

Here, the creep torque may be output without operation of the accelerator pedal and a brake pedal when the gear stage is Drive (D) and may be determined based on the vehicle speed. For example, the creep torque may have a positive value when the vehicle speed is equal to or less than about 8 kph. Therefore, the vehicle speed may increase to about 8 kph. Of course, areas in which the creep torque has a positive value may differ between vehicles.

In addition, the acceleration torque may be determined by multiplying a vehicle wheel maximum torque value by an APS scale value input by the driver. For example, in the case of a vehicle having a vehicle wheel maximum torque of 300 Nm, if the APS value is 20%, the acceleration torque may be 60 Nm. In addition, the maximum torque of the series mode system may mean torque which may be maximally output by the motor when the hybrid system having the structure shown in FIG. 1 is in an HEV series mode.

In addition to the basic condition, the mode determination unit 610 may apply information as to whether there is a torque boosting request (that is, setting) of the driver as a condition. For example, the mode determination unit 610 may be implemented to determine whether the basic condition (that is, the accelerator pedal condition and the torque condition) is satisfied when there is a torque boosting request of the driver.

Accordingly, if the torque condition is not satisfied, that is, if the sum of the creep torque and the acceleration torque is greater than the maximum torque of the series mode system, the HEV parallel mode may be determined. As a result, the above-described torque condition is represented by a graph shown in FIG. 7.

Figure 7:
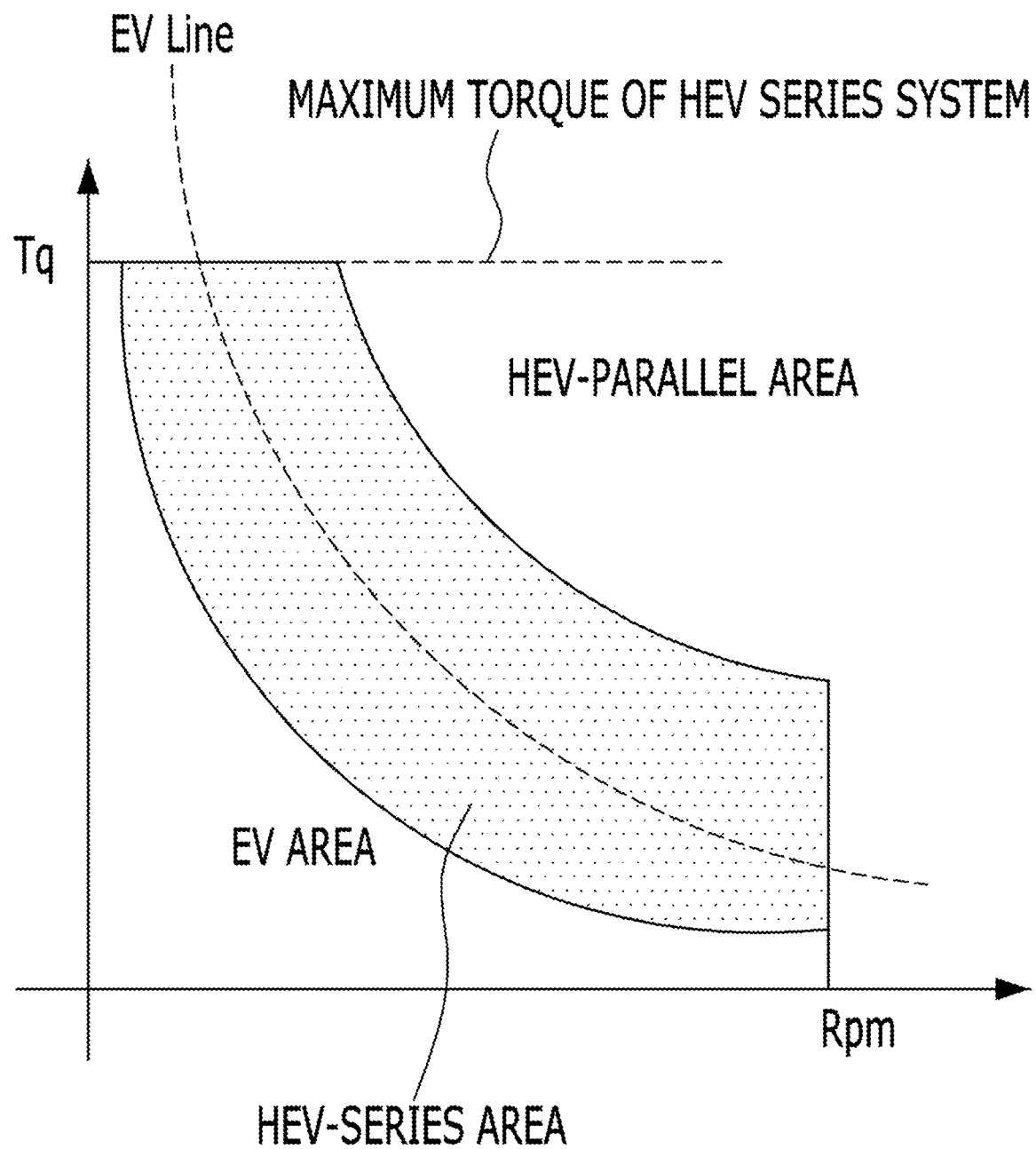
FIG. 7 is a view showing an area per mode based on the RPM of a motor and a required torque in one form of the present disclosure.

FIG. 7 is a view showing an area per mode based on the RPM of a motor and required torque in some forms of the present disclosure. In FIG. 7, the vertical axis represents motor RPM and the horizontal axis represents required torque.

Referring to FIG. 7, in a state in which the accelerator pedal condition is not satisfied, the motor outputs the creep torque according to the vehicle speed. In this section, the hybrid vehicle in some forms of the present disclosure operates in the EV mode. In addition, when the accelerator pedal condition is satisfied, the vehicle operates in the HEV series operation and an area corresponding thereto is an HEV-series area. A low limit point of the HEV-series mode may be changed according to the accelerator pedal condition and an upper limit line is limited by the maximum torque of the series mode system and the maximum power of the series mode system (that is, a value obtained by multiplying the maximum torque of the series mode system by the RPM).

In contrast, in a general hybrid vehicle, when the required power is less than a predetermined EV line, the vehicle operates in the EV mode and, when required power exceeding the EV line is necessary, the vehicle is switched to the HEV parallel mode. As a result, in some forms of the present disclosure, the area to which the HEV mode is applied may be increased by the HEV series mode, as compared to the general hybrid vehicle.

Next, the operation of the calculator 620 will be described as the motor torque calculator 621 and the engine RPM calculator 622. Generally, when the mode determination unit 610 determines that HEV series mode is activated (On), the motor torque calculator 621 and the engine RPM calculator 622 may calculate the motor torque and the engine RPM in the corresponding mode.

First, the motor torque calculator 621 may have the creep torque, the acceleration torque and the torque boosting stage as input values and have the motor torque as an output value. For example, the motor torque calculator 621 may determine "motor torque=func1 (creep torque, acceleration torque, torque boosting stage)". More specifically, the motor torque may be obtained by "creep torque+acceleration torque+ (acceleration torque*torque boosting ratio)". At this time, the torque boosting ratio may have a value corresponding to the torque boosting stage set by the user and the range thereof may be from 0 to 1. The higher torque boosting stage, the larger the value.

Next, the engine RPM calculator 622 may have the creep torque, the acceleration torque, the available power of the battery and the vehicle speed as input values and have the engine RPM as an output value. For example, the engine RPM calculator 622 may determine "engine RPM=func2 (creep torque, acceleration torque, available power of the battery, vehicle speed, APS)".

More specifically, in order to determine the engine RPM, the engine needs to determine engine generation power to be generated through the HSG. Here, the engine generation power may be a value obtained by subtracting the available power of the battery from the required power obtained through the required torque. That is, the available power of the battery may mean power which may be output from the motor when power is not generated in the series mode. In order to satisfy the required power, the HSG 120 needs to generate power using the power of the engine 110 in addition to the available power of the battery. In addition, since the required torque is the sum of the acceleration torque and the creep torque, the required power may be obtained by multiplying the required torque by the motor RPM. In addition, the motor RPM may be obtained through the vehicle speed and the gear ratio of the current gear stage of the transmission.

As a result, the engine generation power may be obtained using the above-described method, and the RPM may be determined by multiplying the APS value (scale) based on the accelerator pedal operation of the driver by the maximum RPM of the engine on the contour power line satisfying the obtained power. Therefore, the engine torque may be determined as a torque value corresponding to the engine RPM determined on the contour power line. At this time, if an engine efficiency map is used, the engine torque and the RPM may be determined in consideration of an optimal efficiency point. This will be described with reference to FIG. 8.

Figure 8:
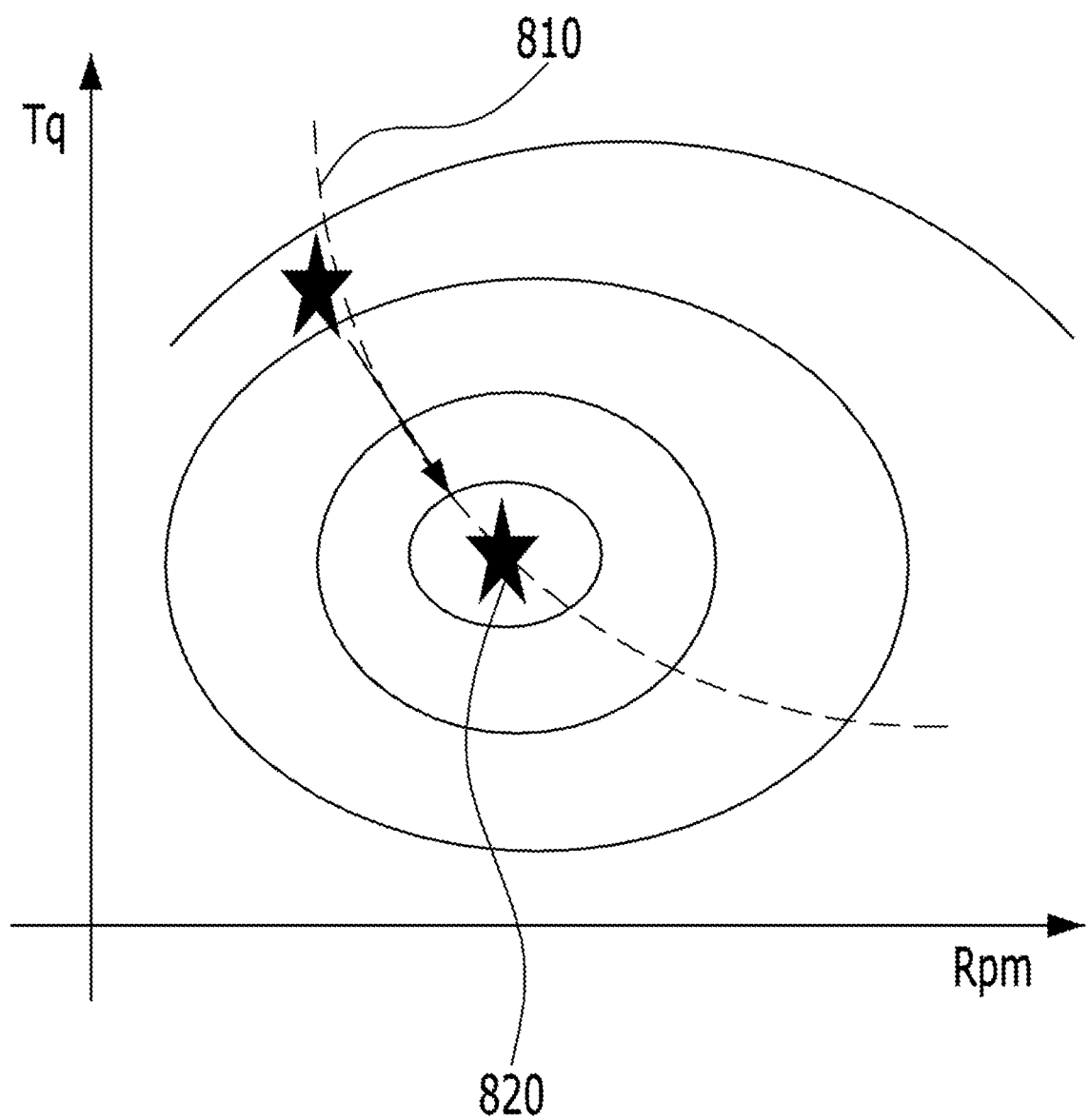
FIG. 8 is a view illustrating determination of an operating point of an engine considering engine generation power and efficiency.

FIG. 8 is a view illustrating determination of an operating point of an engine considering engine generation power and efficiency. In FIG. 8, the horizontal axis represents engine RPM and the vertical axis represents engine torque. Operating points, through a plurality of circular closed curves passes, have the same efficiency and efficiency increases toward the center of the circle.

Referring to FIG. 8, when the engine generation power is obtained, a contour power curve 810 satisfying the corresponding power may be obtained. At this time, a point 820 having highest efficiency among the operating points, through which the contour power curve 810 passes, may become an optimal-efficiency operating point. However, since the hybrid vehicle in some forms of the present disclosure gives more weight to the direct connection of the engine RPM according to performance and accelerator pedal operation than efficiency, the point 820 having highest efficiency is not necessarily selected as the operating point of the engine. For example, the engine RPM calculator 622 in some forms of the present disclosure may move the operating point to a point having higher efficiency on the contour power line only within a certain ratio at the RPM obtained by multiplying the APS % of the driver by the maximum RPM of the driver.

Figure 9:
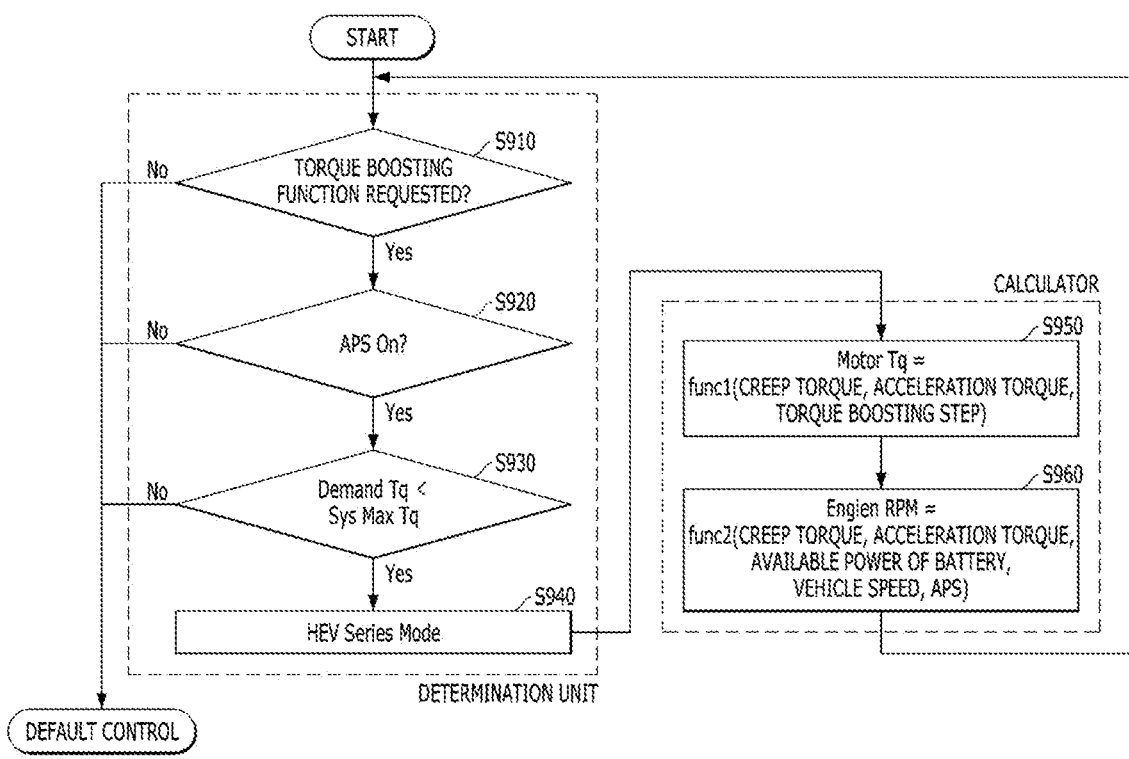
FIG. 9 is a flowchart illustrating an example of an HEV series mode control process in one form of the present disclosure.

The HEV series mode control in some forms of the present disclosure is summarized in the flowchart of FIG. 9. FIG. 9 is a flowchart illustrating an example of an HEV series mode control process in some forms of the present disclosure.

Referring to FIG. 9, first, the determination unit 610 may determine whether to enter the HEV series mode. More specifically, the determination unit 610 may determine entry into the HEV series mode (S940), when the torque boosting function is set (S910), when the accelerator pedal condition is satisfied (S920) and when the torque condition is satisfied (S930).

If any one of the three conditions S910, S920 and S930 is not satisfied, default control for controlling transition between the EV mode and the HEV parallel mode may be performed according to a predetermined required power condition (e.g., the EV line of FIG. 7). For example, when the accelerator pedal condition is not satisfied, the EV mode may be maintained and, when the torque condition is not satisfied, entry into the HEV parallel mode may be performed.

Of course, in some forms of the present disclosure, setting of the torque boosting function may be excluded from the HEV series mode entry conditions.

When the determination unit 610 determines entry into the HEV series mode, the calculator 620 may determine the motor torque based on the creep torque, the acceleration torque and the torque boosting stage (S950), and determine the engine RPM based on the creep torque, the acceleration torque, the available power of the battery, the vehicle speed and the APS value (S960).

The process of determining the motor torque and the engine RPM has been described above and a repeated description thereof will be omitted.

In some forms of the present disclosure, by enlarging the HEV series mode, it is possible to prevent a delay time occurring during mode transition accompanied by engine clutch engagement and to improve acceleration performance of a high-performance eco-friendly vehicle. In addition, since the accelerator pedal and the engine speed are linked, the high-performance sensibility satisfaction of the high-performance eco-friendly vehicle experienced by the driver can be increased. In addition, since the vehicle output torque is varied according to the torque boosting value set by the driver, it is possible to set the variable torque according to the driver's desire.

In the hybrid vehicle in some forms of the present disclosure, it is possible to provide improved operability and acceleration responsiveness.

In some forms of the present disclosure, it is possible to prevent frequent engine engagement and disengagement while satisfying target torque when a high-performance hybrid vehicle travels at a low speed, by increasing the torque of the electric motor through power generated in an HEV series mode.

Some forms of the present disclosure can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, optical data storage devices, and carrier waves (such as data transmission over the Internet).

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. A method of controlling a hybrid vehicle that includes a motor, an engine, and an engine clutch disposed between the motor and the engine, the method comprising:
   determining whether to enter a first mode that operates the engine and the motor without an engagement of the engine clutch based on at least one of a first condition related to an accelerator pedal or a second condition related to a required torque condition;
   when it is determined to enter the first mode, determining a torque of the motor based on at least a required torque;
   determining an operating point of the engine based on engine generation power that is generated by a hybrid starter generator with an engine power and is supplied to the motor, wherein determining the operating point of the engine further comprises:
      determining the engine generation power; and
      first determining a revolutions per minute (RPM) of the engine based on a ratio of an operation amount of the accelerator pedal to a maximum RPM of the engine and then determining an engine torque to satisfy the engine generation power at the determined RPM of the engine; and
   moving the operating point to a point having higher efficiency on a contour power line within a certain ratio at the RPM of the engine obtained by multiplying an APS % based on the operation amount of the accelerator pedal by the maximum RPM of the engine;
   wherein determining the engine generation power comprises:
      determining a required power based on the required torque and an RPM of the motor;
      subtracting an available battery power from the determined required power; and
      when the engine generation power is obtained, obtaining a contour power curve satisfying the corresponding power, a point having highest efficiency among operating points, through which the contour power curve passes, becoming an optimal-efficiency operating point.

2. The method of claim 1, wherein the required torque corresponds to a sum of a creep torque output from the motor and an acceleration torque determined corresponding to the operation amount of the accelerator pedal.

3. The method of claim 2, wherein:
the first condition is satisfied when the operation amount of the accelerator pedal is greater than a predetermined value; and
the second condition is satisfied when a motor maximum torque in the first mode is greater than the required torque.

4. The method of claim 1, wherein determining whether to enter the first mode comprises, when a torque boosting function is set by a driver, entering the first mode, wherein the torque boosting function adds a torque with a predetermined ratio based on the operation amount of the accelerator pedal.

5. The method of claim 4, wherein determining the torque of the motor comprises adding the required torque to a boosting torque corresponding to the torque boosting function.

6. The method of claim 1, wherein the method further comprises, when the first condition is not satisfied, maintaining a second mode that operates the motor only.

7. The method of claim 6, wherein the method further comprises, when the second condition is not satisfied, entering a third mode that operates both the engine and the motor and engages the engine clutch.

8. A non-transitory computer-readable recording medium having a program recorded thereon, the program to direct a processor to perform acts of:
causing a hybrid controller to determine whether to enter a first mode that operates an engine and a motor without an engagement of an engine clutch based on at least one of a first condition related to an accelerator pedal or a second condition related to a required torque condition;
when it is determined to enter the first mode, causing the hybrid controller to determine a torque of the motor based on at least a required torque; and
causing the hybrid controller to determine an operating point of the engine based on engine generation power that is generated by a hybrid starter generator with an engine power and is supplied to the motor; and
causing the hybrid controller to move the operating point to a point having higher efficiency on a contour power line within a certain ratio at an RPM of the engine obtained by multiplying an APS % based on the operation amount of the accelerator pedal by a maximum RPM of the engine;
wherein the operating point of the engine is determined by:
determining the engine generation power; and
first determining a revolutions per minute (RPM) of the engine based on a ratio of an operation amount of the accelerator pedal to a maximum RPM of the engine and then determining an engine torque to satisfy the engine generation power at the determined RPM of the engine; and
wherein determining the engine generation power comprises:
determining a required power based on the required torque and a RPM of the motor; and
subtracting an available battery power from the determined required power; and
when the engine generation power is obtained, obtaining a contour power curve satisfying the corresponding power, a point having highest efficiency among operating points, through which the contour power curve passes, becoming an optimal-efficiency operating point.

9. A hybrid vehicle comprising:
a motor;
an engine;
an engine clutch disposed between the motor and the engine; and
a hybrid controller configured to:
determine whether to enter a first mode that operates the engine and the motor without an engagement of the engine clutch based on at least one of a first condition related to an accelerator pedal or a second condition related to a required torque condition;
determine a torque of the motor based on at least a required torque when it is determined to enter the first mode; and
determine an operating point of the engine based on engine generation power that is generated by a hybrid starter generator with an engine power and is supplied to the motor,
determine a revolutions per minute (RPM) of the engine based on a ratio of an operation amount of the accelerator pedal to a maximum RPM of the engine; and
determine an engine torque to satisfy the engine generation power at the determined RPM of the engine,
determine a required power based on the required torque and a RPM of the motor;
subtract an available battery power from the determined required power;
when the engine generation power is obtained, obtain a contour power curve satisfying the corresponding power, a point having highest efficiency among operating points through which the contour power curve passes becoming an optimal-efficiency operating point; and
move the operating point to a point having higher efficiency on a contour power line within a certain ratio at the RPM of the engine obtained by multiplying an APS % based on the operation amount of the accelerator pedal by the maximum RPM of the engine.

10. The hybrid vehicle of claim 9, wherein the required torque corresponds to a sum of a creep torque output from the motor and an acceleration torque determined corresponding to the operation amount of the accelerator pedal.

11. The hybrid vehicle of claim 10, wherein:
the first condition is satisfied when the operation amount of the accelerator pedal is greater than a predetermined value; and
the second condition is satisfied when motor maximum torque in the first mode is greater than the required torque.

12. The hybrid vehicle of claim 9, wherein the hybrid controller is configured to enter the first mode when a torque boosting function is set by a driver, wherein the torque boosting function adds a torque with a predetermined ratio based on the operation amount of the accelerator pedal.

13. The hybrid vehicle of claim 12, wherein the hybrid controller is configured to determine the torque of the motor by adding the required torque to a boosting torque corresponding to the torque boosting function.

14. The hybrid vehicle of claim 9, wherein the hybrid controller is configured to:
maintain a second mode that operates the motor only when the first condition is not satisfied.

15. The hybrid vehicle of claim 14, wherein the hybrid controller is configured to enter a third mode that operates both the engine and the motor and engages the engine clutch when the second condition is not satisfied.

16. The non-transitory computer-readable recording medium of claim 8, wherein the required torque corresponds to a sum of a creep torque output from the motor and an acceleration torque determined corresponding to the operation amount of the accelerator pedal.

17. The non-transitory computer-readable recording medium of claim 16, wherein:
   the first condition is satisfied when the operation amount of the accelerator pedal is greater than a predetermined value; and
   the second condition is satisfied when a motor maximum torque in the first mode is greater than the required torque.

18. The non-transitory computer-readable recording medium of claim 8, wherein it is determined to enter the first mode when a torque boosting function is set by a driver, wherein the torque boosting function adds a torque with a predetermined ratio based on the operation amount of the accelerator pedal.

19. The non-transitory computer-readable recording medium of claim 8, wherein, when the first condition is not satisfied, the program is programmed to direct the processor to cause the hybrid controller to maintain a second mode that operates the motor only.

20. The non-transitory computer-readable recording medium of claim 19, wherein, when the second condition is not satisfied, the program is programmed to direct the processor to cause the hybrid controller to enter a third mode that operates both the engine and the motor and engages the engine clutch.

\* \* \* \* \*